United States Patent
Jamieson et al.

(10) Patent No.: US 12,278,849 B2
(45) Date of Patent: Apr. 15, 2025

(54) COMMUNICATION WITH A BANK TELLER

(71) Applicant: NCR Voyix Corporation, Atlanta, GA (US)

(72) Inventors: Daniel James Jamieson, Scotland (GB); Michael Jonathan McKaig, Scotland (GB); Daniel Michael Grossi, Scotland (GB); Kevin Horgan, Scotland (GB)

(73) Assignee: DIGITAL FIRST HOLDINGS LLC, Atlanta, GA (US)

( * ) Notice: Subject to any disclaimer, the term of this patent is extended or adjusted under 35 U.S.C. 154(b) by 139 days.

(21) Appl. No.: 18/216,662

(22) Filed: Jun. 30, 2023

(65) Prior Publication Data

US 2025/0007963 A1     Jan. 2, 2025

(51) Int. Cl.
*H04L 65/1069*     (2022.01)
*H04B 5/72*     (2024.01)

(52) U.S. Cl.
CPC .......... *H04L 65/1069* (2013.01); *H04B 5/72* (2024.01)

(58) Field of Classification Search
CPC .............................. H04L 65/1069; H04B 5/72
See application file for complete search history.

(56) References Cited

U.S. PATENT DOCUMENTS

| | | | |
|---|---|---|---|
| 6,748,367 B1 * | 6/2004 | Lee ...................... | G06Q 20/382 705/64 |
| 10,387,865 B2 * | 8/2019 | Koeppel ............ | G06Q 20/3221 |
| 2011/0208657 A1 * | 8/2011 | Rao ..................... | H04W 12/068 705/41 |
| 2013/0198069 A1 * | 8/2013 | Latimer ............... | G06Q 20/042 705/42 |
| 2014/0194148 A1 * | 7/2014 | Griffin ................. | G09B 29/003 455/456.3 |
| 2014/0256249 A1 * | 9/2014 | Tse .......................... | H04B 5/77 455/41.1 |
| 2016/0225071 A1 * | 8/2016 | Breen ................ | G06Q 20/3221 |
| 2018/0247275 A1 * | 8/2018 | Petrov ................. | G06Q 20/405 |
| 2019/0164161 A1 * | 5/2019 | Sultan ................. | G06Q 20/042 |
| 2021/0027295 A1 * | 1/2021 | Raquepaw ........... | G07F 19/206 |

\* cited by examiner

*Primary Examiner* — El Hadji M Sall
(74) *Attorney, Agent, or Firm* — Notaro, Michalos & Zaccaria P.C.; John S. Economou

(57) ABSTRACT

A method and a computing system for detecting, at an ATM, an input event indicating that a user of the ATM wants to communicate with a bank teller; responsive to detecting the input event, by the ATM, establishing a first communication link with a computing device of a selected remote bank teller and requesting the user to place a mobile device of the user within a detection range of an electromagnetic signal reader of the ATM; and responsive to the user placing the mobile device within the detection range of the electromagnetic signal reader, establishing, by the ATM, a second communication link with the mobile device; thereby establishing a point-to-point communication link between the computing device and the mobile device.

20 Claims, 3 Drawing Sheets

COMMUNICATION WITH A BANK TELLER

FIELD OF THE INVENTION

The present invention relates to a method and a computing system for establishing a point-to-point communication link between a device belonging to a user of an ATM and a device that is being operated by a remote bank teller. In particular, but not exclusively, the present invention relates to a methodology whereby an ATM can establish a communication link with a device of a bank teller and also has an electromagnetic signal reader such as an NFC reader that can be used to establish a communication link between the ATM and a mobile device of a user such that audio data and optionally video data can be relayed along a point-to-point communication link from the mobile device to the device of the bank teller and vice versa.

BACKGROUND

Automated Teller Machines (ATMs) are known. An automated teller machine (ATM) is an electronic banking outlet that allows customers/users to complete basic transactions without the aid of a bank representative or teller. Anyone with a credit card or debit card can access transaction services at most ATMs. ATMs provide both basic cash-dispensing services as well as advanced functions, including: check depositing, account information access, fund transfers, marketing of relevant products and the like. Historically, ATMs have not included any functionality to enable a user to communicate with a remote bank teller. However, newer types of ATM do have additional functionality that enables a user to communicate with a bank teller. These new types of ATMs are sometimes referred to as Interactive Teller Machines (ITMs). ITMs offer the basic components of an ATM, such as the receipt printer and card reader; however, ITMs usually include additional features such as: a video camera and handset for conducting conversations with a teller, a coin dispenser for distributing different denominations of coins, an ID scanner for authenticating the customer, a signature pad and the like.

Interactive Teller solutions today rely on specialised physical hardware on the ATM to allow for the transmission of audio and video content between the user and the teller. Typical placements of this hardware today vary depending on the type of terminal being deployed. On terminals that are designed for a walk-up user, the handset is affixed to the terminal and takes up significant, and valuable, fascia and/or top-box space on the ATM due to the length of the coil required. These solutions provide hardware limitations on smaller footprint terminals where real estate on the fascia and internal to the terminal is at a premium. On drive-up units, the audio functionality of Interactive Teller solutions is typically enabled through public audio speakers from the unit to allow the driver to communicate with the remote teller due to the use of a handset on drive-up units being non-ideal. This raises obvious privacy concerns with a user's personal information being broadcast through an audible public speaker. Using a handset affixed to such an ATM is not an effective solution due to the risk of damage from a user driving off, etc.

These hardware requirements for communication also mean that for an ATM to be upgraded to an ITM in the field there are typically significant hardware upgrades required. On some ATMs it is not possible to upgrade them due to the initial configuration not allowing for ITM-specific modules to be retrofitted. This causes significant expense for an ATM operator.

SUMMARY

It is an aim of the present invention to at least partly mitigate one or more of the above-mentioned problems.

It is an aim of certain embodiments of the present invention to help enable the establishment of a point-to-point communication link between a mobile device of a user of an ATM and a computing device of remote bank teller.

It is an aim of certain embodiments of the present invention to help provide a Bluetooth connection between a mobile device of a user and an ATM which allows audio data (and optionally video data) to be transmitted between the mobile device and the ATM where it can be provided to a device of a bank teller.

It is an aim of certain embodiments of the present invention to help enable inherent hardware limitations at ATMs to be removed, enabling two-way communication which is a requirement for Interactive Teller solutions to be deployed on any ATM even if it was shipped as an ATM without ITM capabilities.

It is an aim of certain embodiments of the present invention to help establish a communication link between a bank teller's device and a user's mobile phone such that the need for complex hardware (such as enhanced functionality handsets) can be removed from an ATM.

It is an aim of certain embodiments of the present invention to help address problems with Bluetooth connectivity in the context of usability and security when applied to the ATM/ITM environment. For example, certain embodiments help address problems with inherent poor experience of manually selecting a Bluetooth-capable devices to pair to and the process of Numeric Comparison or Passkey Entry and also help address the propensity for eavesdropping and remote attacks.

It is an aim of certain embodiments of the present invention to help enable a bank teller to communicate with a user of an ATM via an interactive virtual teller experience in a way that prevents the use of speakers on the ATM (whose audio may be heard by members of the public), thus increasing a user's data privacy.

According to a first aspect of the present invention there is provided a computer-implemented method for establishing a point-to-point communication link between a mobile device of a user of an ATM and a computing device of a selected remote bank teller, comprising the steps of: detecting, at an ATM, an input event indicating that a user of the ATM wants to communicate with a bank teller; responsive to detecting the input event, by the ATM, establishing a first communication link with a computing device of a selected remote bank teller and requesting the user to place a mobile device of the user within a detection range of an electromagnetic signal reader of the ATM; and responsive to the user placing the mobile device within the detection range of the electromagnetic signal reader, establishing, by the ATM, a second communication link with the mobile device; thereby establishing a point-to-point communication link between the computing device and the mobile device.

Aptly, the method further comprises: establishing the point-to-point communication link as a communication link that comprises the first communication link and the second communication link.

Aptly, the method further comprises: establishing the second communication link as a wireless Out-Of-Band Bluetooth communication link.

Aptly, the electromagnetic signal reader is an NFC reader and is optionally a contactless card reader of the ATM.

Aptly, the method further comprises: establishing the second communication link responsive to the mobile device being placed within a detection range of the electromagnetic signal reader of less than 10 cm and optionally less than 4 cm.

Aptly, the method further comprises: responsive to the user placing the mobile device within the detection range of the electromagnetic signal reader, sending, by the mobile device, identification data associated with the mobile device to the ATM.

Aptly, the method further comprises: responsive to the user placing the mobile device within the detection range of the electromagnetic signal reader, sending, by the ATM, identification data associated with the ATM to the mobile device.

Aptly, the method further comprises: responsive to detecting the input event, executing, by the ATM, a terminal application that is configured to communicate with the computing device.

Aptly, the method further comprises: responsive to detecting the input event, sending a notification to at least one computing device of the selected remote bank teller indicating that the user wants to communicate; and responsive to receiving, at the computing device, the notification, executing, by the computing device, a teller application that is configured to communicate with the ATM.

Aptly, the method further comprises: detecting the input event as a request by the user for a communication session with a bank teller.

Aptly, the method further comprises: requesting the user to place the mobile device within the detection range of the electromagnetic signal reader of the ATM by requesting the user to tap the mobile device on the electromagnetic signal reader.

Aptly, the method further comprises: capturing audio data via a microphone of the mobile device; via the point-to-point communication link, transmitting the audio data to the computing device; and outputting the audio data via a speaker of the computing device.

Aptly, the method further comprises: capturing audio data via a microphone of the computing device; via the point-to-point communication link, transmitting the audio data to the mobile device; and outputting the audio data via a speaker of the mobile device.

Aptly, the method further comprises: capturing video data via a camera of the ATM; via the first communication link, providing the video data from the ATM to the computing device; and displaying a video feed comprising the video data on a display of the computing device.

Aptly, the method further comprises: capturing video data via a camera of the computing device; via the first communication link, providing the video data from the computing device to the ATM; and displaying a video feed comprising the video data on a display of the ATM.

Aptly, the method further comprises: capturing video data via a camera of the mobile device; via the point-to-point communication link, providing the video data from the mobile device to the computing device; and displaying a video feed comprising the video data on a display of the computing device.

Aptly, the method further comprises: capturing video data via a camera of the computing device; via the point-to-point communication link, providing the video data from the computing device to the mobile device; and displaying a video feed comprising the video data on a display of the mobile device.

Aptly, the method further comprises: establishing the point-to-point communication link as a bi-directional audio only communication link. According to a second aspect of the present invention there is provided a computing system, comprising: an ATM, a mobile device of a user of an ATM and a computing device of a selected remote bank teller, wherein the ATM is configured to: detect an input event indicating that a user of the ATM wants to communicate with a bank teller; establish a first communication link with a computing device of a selected remote bank teller and request the user to place the mobile device within a detection range of an electromagnetic signal reader of the ATM responsive to the input event being detected; and establish a second communication link with the mobile device responsive to the user placing the mobile device within the detection range of the electromagnetic signal reader; thereby causing a point-to-point communication link to be established between the computing device and the mobile device.

Aptly, the computing device is a desktop computer or a laptop or a mobile device of the selected remote bank teller.

Certain embodiments of the present invention help eliminate the need for additional hardware to be installed on ATMs to enable ITM transactions, increasing the number of placements that ITMs can be installed in by reducing the pressure on ATM fascia and cabinetry real estate.

Certain embodiments of the present invention help a remote bank teller to communicate with a user of an ATM to guide them through transactions in a private manner.

Certain embodiments of the present invention help provide a methodology for the establishment of a point-to-point communication link between a mobile device of a user of an ATM and a computing device of a remote bank teller such that two-way audio streaming can be achieved without the need to have any hardware or software for enabling audio input/output on the ATM.

Certain embodiments of the present invention help permit the upgrade of an existing ATM to become an ITM, without requiring the physical addition of microphones and cameras to enable this change. This effectively permits all ATMs to be extended to have functionality of ITMs.

Certain embodiments of the present invention help provide the ability to deliver ITM functionality in a more private environment through utilizing the consumer's mobile device for audio content in all placements. This is important in placements such as drive-up or certain walk-up placements where currently only public audio is available.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
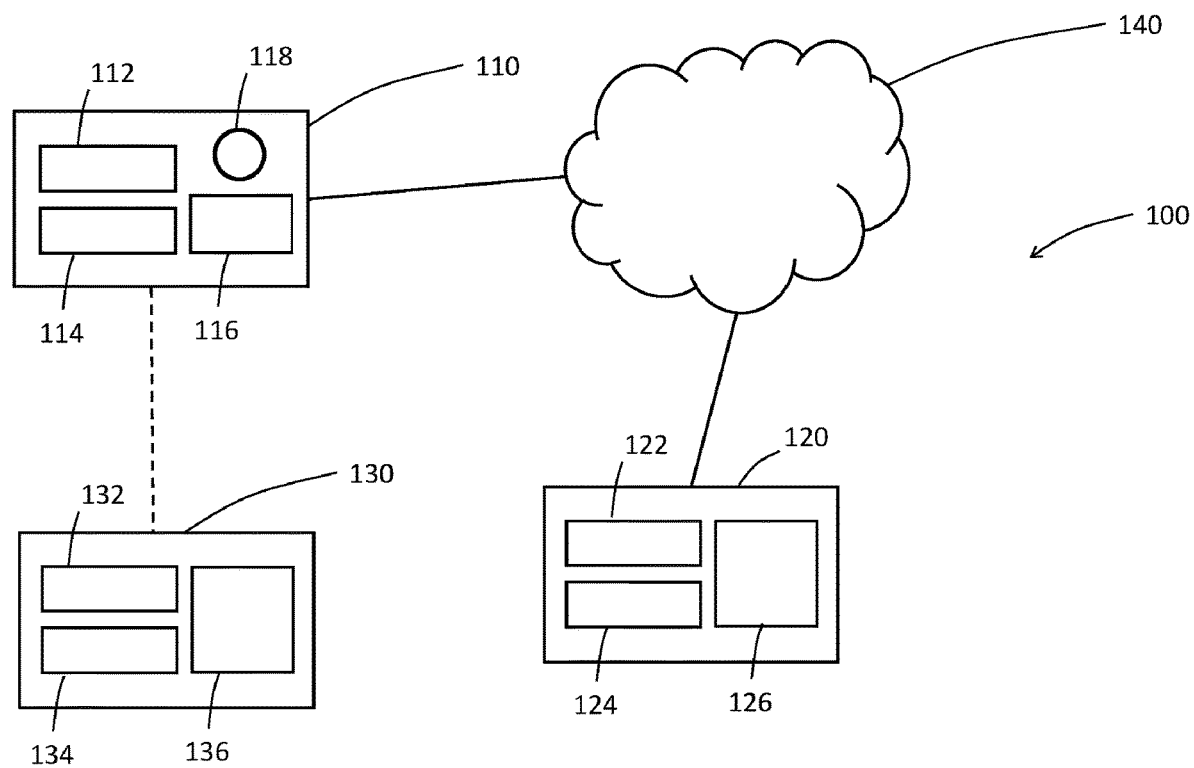
FIG. 1 illustrates a computing system.

FIG. 1 illustrates a computing system 100. In the computing system 100 there is an Automated Teller Machine (ATM) 110, a computing device 120 of a remote bank teller, and a mobile device 130 of a user of the ATM. The ATM may or may not be an Interactive Teller Machine (ITM). The ATM includes one or more processors 112, at least one memory 114 and a display 116. The memory is a non-transitory computer-readable storage medium. The memory 114 stores executable software that is executable by the processors 112 of the ATM. The display 116 displays a graphical user interface for enabling the user to enter details and select options during transactions at the ATM. The executable software of the ATM, when executed by the processor(s), causes the ATM to carry out the methodology described herein. The ATM may also include a communication interface (not shown) for communicating with the computing device 120. The ATM may also include an electromagnetic signal reader 118. This electromagnetic signal reader may be an NFC reader. The NFC Reader may be the contactless card reader (CCR) that is already present on the ATM. Alternatively, a separate NFC reader may be provided. It will be appreciated that Near-Field Communication (NFC) is a set of protocols that allows communication between two devices over very small distances (e.g., less than around 10 cm). NFC technology may be used herein to facilitate the establishment of a secure out-of-band (OOB) Bluetooth connection between the user's mobile device and the ATM Hardware/Client ITM Application. NFC is a secure connection method to protect against remote and eavesdropping attacks as the capacity for illegitimately connecting is vastly reduced given the connection cannot be made outside of a 10 cm distance to the NFC reader, thus, the perpetrating criminal would be clearly known to the ATM user. It will likewise be appreciated that Out-of-Band (OOB) Bluetooth is an association model of Bluetooth connectivity that is intrinsically more secure than other models (e.g., Just Works, Numeric Comparison or Passkey Entry) as it does not share the Key over the 2 GHz band used by the BLE protocol, it uses other mediums that are hardened against eavesdropping. An OOB Bluetooth connection between the user's mobile device and the ATM/Hardware/Client ITM Application may be established to facilitate the constant stream of audio content to the Teller-Side Application enabling the Bank Staff member to assist the user through the transaction. Many ATMs already have the functionality present to enable Bluetooth connections. However, retrofitting is also possible by installing a module on the ATM that enables Bluetooth communications. This could form part of the PC Core/Processor architecture, or it could be a sperate, firewalled and protected module. This could for example be any industry-standard secure Bluetooth module. The ATM may also include an encrypted PIN pad (not shown), a note dispenser, a receipt printer, a card slot for insertion of a user's bank card (not shown), a camera (not shown), a barcode reader (not shown), a microphone, speakers or the like as will be appreciated by a person of skill in the art. When the ATM is an ITM, the ATM may further include additional functionality. For example, the ITM may include a signature pad, an ID scanner, a telephonic handset, a wired headset, a tactile keyboard, a beamforming microphone or the like as will be appreciated by a person of skill in the art. This hardware may not be present on a conventional non-ITM ATM. The ITM may also have functionality to enable an audio and video communication link to be established with a remote teller device. This functionality may not be present on a conventional non-ITM ATM.

The computing device 120 is a computing device of the remote bank teller. For example, the computing device may be a laptop, a desktop computer, a mobile device, a tablet or the like. The computing device 120 also includes one or more processors 122, at least one memory 124 and a display 126. The memory 124 is also a non-transitory computer readable storage medium. The memory 124 stores executable software that is executable by the processors of the computing device. The display 126 also displays a graphical user interface where the remote bank teller may be shown in real-time a virtual desktop corresponding to the screen being shown on the ATM. The computing device may also include a communication interface (not shown) for communicating with the ATM and the mobile device of the user. The computing device may also include a microphone (not shown), speakers (not shown), a camera (not shown) and the like.

The mobile device 130 of the user is for example a smartphone or tablet or the like. The mobile device 130 also includes one or more processors 132, at least one memory 134 and a display 136. The memory 134 is also a non-transitory computer readable storage medium. The memory 134 stores executable software that is executable by the processors of the mobile device. The display 136 also displays a graphical user interface. The mobile device may also include a communication interface (not shown) for communicating with the computing device. The mobile device may also include an electromagnetic signal transmitter (not shown) such as an NFC tag that interacts with the NFC reader of the ATM to establish a communication link between the ATM and the mobile device. The mobile device may also include a Bluetooth chipset (not shown) to enable Bluetooth connections to be established with the mobile device.

The ATM 110 and computing device 120 communicate via a network 140. The network 140 may be wired, wireless or a combination of wired and wireless. For example, the network is the internet. In some instances, the ATM and computing device may communicate with each via a separate secured private network. The ATM 110 and mobile device 130 communicate via a short-range wireless communication link (indicated by the dashed line) such as an Out of Band Bluetooth communication link as discussed in more detail herein.

Figure 2:
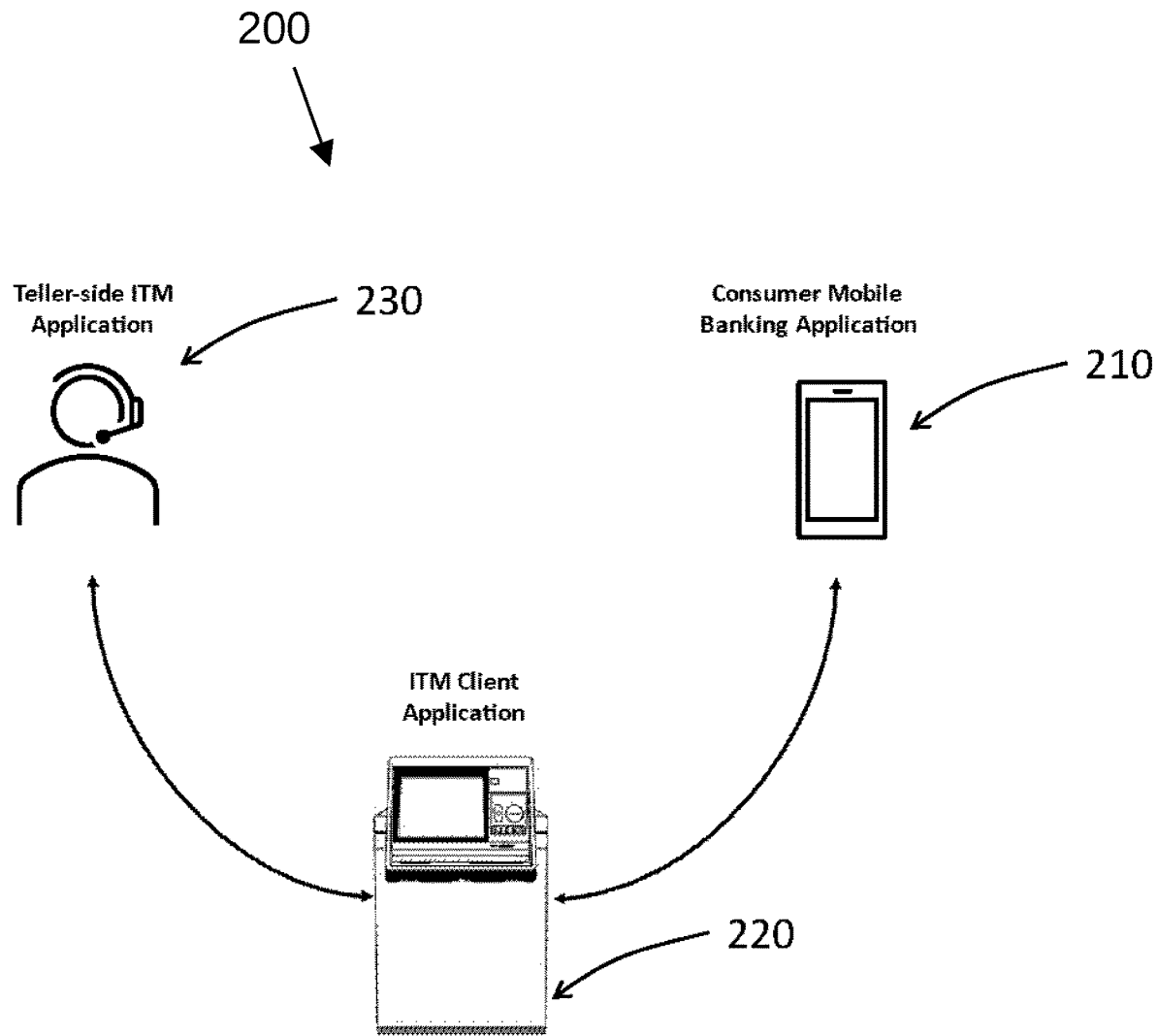
FIG. 2 illustrates certain applications that communicate with one another according to the methodology described herein.

FIG. 2 illustrates a system 200 showing the applications that execute on a mobile device of a user of an ATM, a computing device of a remote bank teller and the ATM to perform the methodology described herein. The ATM, mobile device of the user, and computing device may be those as described with reference to FIG. 1. In FIG. 2, the ATM is an ITM. However, it will be appreciated that in certain other embodiments the ATM may not be an ITM.

On the mobile device, there is executed a mobile application 210. That is, the mobile application is stored in the memory of the mobile device and is executed on processor(s) of that device. The mobile application may be referred to as an 'app'. The mobile application is a mobile banking application associated with the user's bank as will be appreciated by a person of skill in the art. In other words, the mobile application is the individual bank's existing mobile banking application which allows for users to interact with and complete online banking transactions on their mobile device (i.e., it is a Consumer Mobile Banking Application). This existing mobile banking application is augmented with an additional module which allows for the transmission of two-way audio (and optionally video) content to/from the ATM, utilizing the mobile device's in-built camera and microphone and Bluetooth modules for the transmission of content and the display and speakers for presenting received content. According to certain other embodiments, the application executing on the mobile device may instead be a native application of the mobile device or a third-party mobile application or the like that makes use of the mobile device's Bluetooth connection to enable audio data (and optionally video data) to be transmitted from the mobile device to the ATM and vice versa and then output by the mobile device's speakers (and presented on the display if video data is also received).

On the computing device of the remote bank teller, there is executed a teller application. That is, the teller application is stored in the memory of the computing device and is executed on processor(s) of that device. The teller application is an application that executes on the computing device of the teller. The teller application enables the teller to assist the user with transactions at an ATM (e.g., by controlling the ATM). The teller application may be referred to as a Teller-side ITM Application. As described herein, this application is utilized on a device (e.g., PC, laptop) within the bank's call centre or branch. This application is how the member of bank staff interacts with the ATM and can perform transactions on the user's behalf. As will be appreciated by a person of skill in the art, these types of application are currently utilized by a member of bank staff to transmit video & audio content of the bank member of staff, collected through a video camera and microphone, to the terminal application executing on the ATM (referred to as the ITM Client Application) and for receiving video/audio content from the ITM Client Application. However, according to the new methodology described herein, this two-way audio is instead transmitted by the Teller-side ITM Application to the Client ITM Application and then via Bluetooth to the user's mobile device where it is presented using the mobile device's native speakers. This route is inverted for the flow of audio data from the user's mobile phone microphone back to the Teller-side ITM Application. It will thus be appreciated that this does not require any change to the Teller-Side ITM Application which only sees the transmission/reception of audio data to/from the ATM. The Teller-side ITM Application also still behaves as it does currently for other functions such as driving transactions, authenticating users etc. In other words, compared to current Teller-side ITM Applications, for the teller application described herein, audio content is received/transmitted from/to the user's mobile device via the Client ITM Application & associated ATM/ITM hardware instead of to/from the ATM only.

On the ATM, there is executed a terminal application. That is, the terminal application is stored in the memory of the ATM and is executed on processor(s) of the ATM. The terminal application may be referred to as an ITM Client Application. The terminal application is deployed on the terminal and used to instruct the terminal on transactions. Currently, this type of application utilizes cameras and a microphone on the terminal to capture the user and transmit it to the Teller-side ITM Application. However, according to the new methodology described herein, the microphone (and optionally the camera) on the terminal is not utilized/required. A utility is present within the Client ITM Application that allows for the transmission of data over Bluetooth from/to the user's mobile device. Thus, the Client ITM Application may have no audio functionality and, instead of gathering and presenting audio data itself, may transmit audio data from the Teller-Side ITM Application to the mobile device of the user of vice versa. The transaction flow between the ITM Client Application and the Teller-side ITM Application however remains unchanged with all existing transactions and modules maintained. This thus still enables the teller to assist the user in the completion of any given transaction(s). Fundamentally, the authentication of the user to allow for any transactions also remains unchanged and is not impacted by this change on the method of communication, using existing PCI compliant methods for standard transactions (eg. Chip & pin, contactless NFC) and for extended transactions, still utilizing other devices (eg. ID scanners and/or passport recognition). The only change in approach described herein is in the method for two-way audio communication. That is to say, the ITM Client Application behaves similarly to how current applications work except for how audio/video content is handled.

Figure 3:
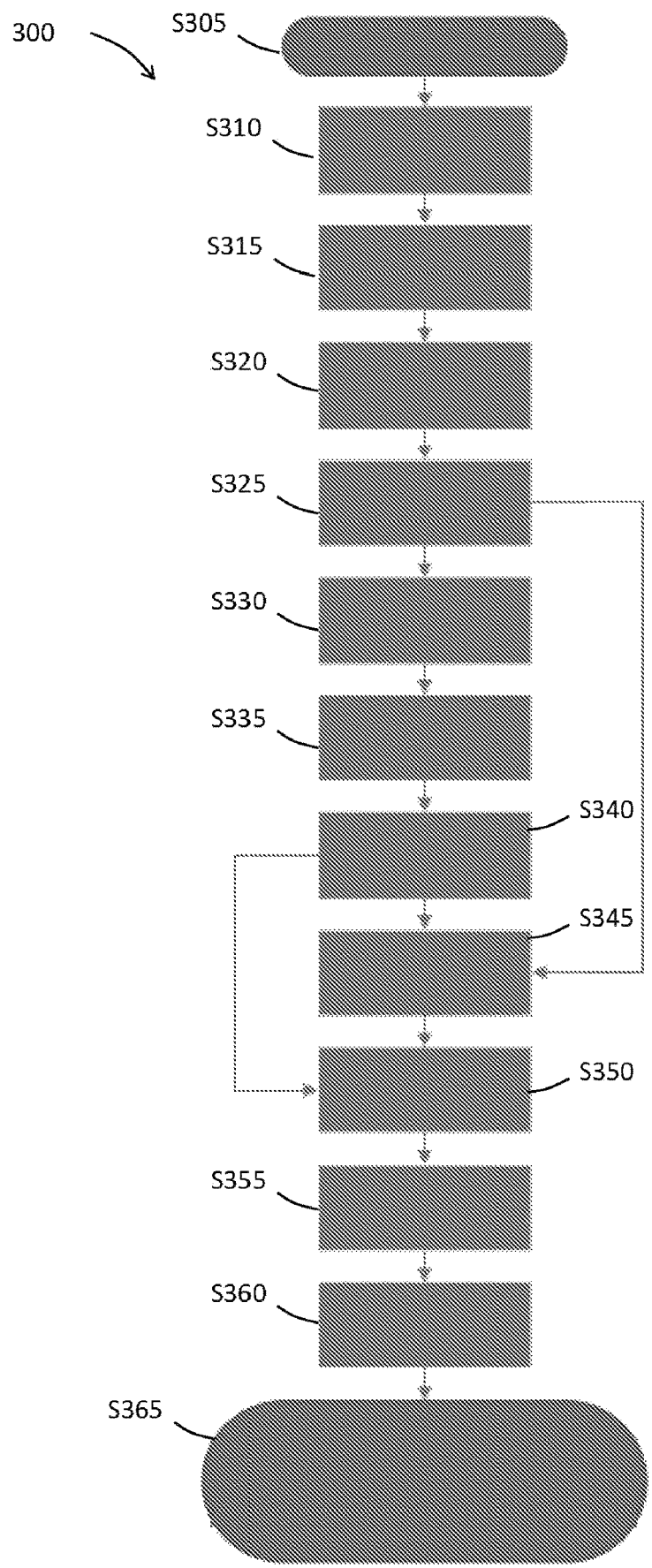
FIG. 3 illustrates a flowchart describing the steps taken to establish a communication link between a computing device of a bank teller and a user's mobile device.

FIG. 3 illustrates a flowchart 300 describing how a communication link is established between a mobile application executing on a mobile device of a user of an ATM and a teller application executing on a computing device of a remote bank teller. The ATM, mobile device of the user, and computing device may be those as described with reference to FIG. 1. In FIG. 2, the ATM is a non-ITM ATM. However, it will be appreciated that in certain other embodiments the ATM may be an ITM.

At a first step S305, a user approaches an ATM to begin a transaction. The ATM may be a through-the-wall ATM, in a bank branch, in a drive-up location, external free-standing placement or the like. The ATM may be an ITM. Thereafter, in a step S310, the user initiates a transaction at the ATM. This may involve the ATM presenting an interface asking the user to authenticate. For example, the ATM may request that the user inserts a bank card into a card slot of the ATM or scan their card on a contactless reader of the ATM and then enter their PIN. The user is then authenticated. If the user is correctly authenticated, the transaction proceeds. If not, the user may have to repeat the authentication process. Alternatively or additionally, the user may not be authenticated until a communication link is established between the devices of the bank teller and the user as discussed below. In this case, the bank teller may authenticate the user by visually comparing the user's appearance to that of an appearance on the user's ID card/Passport or the like. In a next step S315, the user indicates that they would like to communicate with a bank teller. The user may do this by making a selection via the display or a keypad of the ATM that they would like to communicate with a bank teller. This selection is detected as an input event by the ATM that the user would like to communicate with a bank teller.

Following the ATM detecting that the user wants to communicate with a bank teller, in a step S320, a terminal application (Client ITM Application) that is configured to communicate with the teller application on the computing device of the remote teller is executed. This terminal application also includes functionality enabling establishment of a Bluetooth communication link with the user's mobile device. Initiation of the terminal application causes two things to happen as discussed below.

One of these things is that, once the terminal application has been initiated, the teller application is also activated/executed in a step S325. This may be achieved by the ATM sending a notification to the computing device of a selected teller and the computing device executing the teller application in response to receipt of this notification. As a result, a communication link is then established between the computing device (particularly the teller application) and the ATM (particularly the terminal application) as shown in step S345.

The second of these things is that the user is requested to bring their mobile device into a detection range of the NFC reader on the ATM in a step S330. This may be achieved by the ATM displaying a screen (via the Client ITM Application) which prompts the user to "tap" the mobile device on the NFC reader. It will be appreciated that a "tap" involves the user placing the mobile device on, at or near the NFC reader. During this "tap", in a step S335, device identifying data for the mobile device is sent from the mobile device to the ATM and device identifying data for the ATM is sent from the ATM to the mobile device such that a Bluetooth Pairing Connection (a wireless communication link) is established between the ATM and the mobile device in a step S340.

With the communication link between the ATM and mobile device established and the communication link between the ATM and computing device established, it will be appreciated that a point-to-point communication link is thus established between the computing device of the teller and the mobile device of the user. This is shown in step S350.

This point-to-point communication link is in some embodiments a bi-directional audio communication link that allows an audio feed to be transmitted between the teller application and the mobile device which allows for verbal communication between the user and the teller staff. There is no audio feed established on the terminal. Thus, in step S355 two-way audio streaming between the teller's device and the user's mobile device is conducted (using Bluetooth). Via this point-to-point communication link, at the bank teller's device, an audio feed is received from the mobile device including audio data captured via the microphone of the mobile device. The audio feed is output via speaker's of the bank teller's device. This audio feed may be transmitted over Bluetooth to the ATM and then over the internet (e.g., via Wi-Fi, cellular data etc.) to the teller's computing device. In some embodiments, a video feed may also be received (in addition to the audio feed) at the bank teller's device. The video feed may be transmitted from the user's mobile device to the bank teller's device based on video data captured by the camera of the user's mobile device. Alternatively, the video feed may be transmitted based on video data captured by a camera of the ATM. At the user's mobile device, an audio feed is received including audio data captured via a microphone of the bank teller's device. This audio feed may be output by the mobile device's speakers. This audio feed may be transmitted from the teller's device to the ATM over the internet (e.g., via Wi-Fi, cellular data etc.) and from the ATM to the mobile device via Bluetooth. In some embodiments, a video feed of the bank teller may also be provided to the user. For example, a video feed including video data captured by a camera of the bank teller's device may be transmitted to and displayed on a display of the user's mobile device. Alternatively, the video feed may be displayed on a display of the ATM. Thus, it is possible to establish a two-way audio-video communication link between the user's device and the bank teller's device where desired.

In a step S360, the user completes the transaction at the ATM with the assistance of the teller (with all audio data coming through their mobile device). All other transactions, user flows and forms of authentication currently provided between teller applications and terminal applications remains unchanged.

Once the transaction is complete, in a step S365, the session is terminated. This may be due to the mobile device being put in standby mode or powered down or by the mobile application being closed or by the teller application or by the terminal application being closed. When this occurs the Bluetooth connection is terminated and the audio feed between the mobile device and the teller application is disconnected. The terminal application is closed and the terminal returns to the standard non-interactive terminal application. The mobile application may also close the module and returns to its standard screens.

This methodology described above may be summarised as follows. The user approaches the ATM and initiates a transaction. The user selects a control on the display which is in the effect of "Speak with a Teller", this initiates the Client ITM Application and associated functionality. Then, the Teller-Side Application will execute on the Bank Staff member's device. The user is also prompted by the Client ITM Application to "tap" their mobile device on the ATM's in-built NFC Reader (most commonly a Contactless Card Reader [CCR]). The device identifying data is transferred between the user mobile device and the ATM-using NFC industry-standard methodologies and encryption algorithms. The devices, now having identified each other, are now able to establish a seamless OOB Bluetooth connection with each other-requiring no user interaction (e.g. Numeric Comparison or Passkey Entry) as the NFC interaction acts as authentication of intent to connect. Once connected, the Teller-side Application will initiate the Audio/Video call with the ATM HW & Client ITM Application. The user's mobile device gathers, transmits and makes audible to the user the audio data through a native application on the device, a module within a Consumer mobile banking Application, a third-party application or the like. Bi-directional Audio communication is executed between the user and the teller over Bluetooth via the mobile device and the transactions, user flows and authentication methods remain unchanged. When the session is terminated, either by the Client ITM Application or the Teller-side Application, the Bluetooth connection is terminated and the session ends on all devices.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for establishing a point-to-point communication link between a mobile device of a user of an ATM and a computing device of a selected remote bank teller, comprising:
    detecting, at an ATM, an input event indicating that a user of the ATM wants to communicate with a bank teller;
    responsive to detecting the input event, by the ATM, establishing a first communication link with a computing device of a selected remote bank teller and requesting the user to place a mobile device of the user within a detection range of an electromagnetic signal reader of the ATM; and
    responsive to the user placing the mobile device within the detection range of the electromagnetic signal reader, establishing, by the ATM, a second communication link with the mobile device;
    thereby establishing a point-to-point communication link between the computing device and the mobile device.

2. The method of claim 1, further comprising:
    establishing the point-to-point communication link as a communication link that comprises the first communication link and the second communication link.

3. The method of claim 1, further comprising:
    establishing the second communication link as a wireless Out-Of-Band Bluetooth communication link.

4. The method of claim 1, wherein the electromagnetic signal reader is an NFC reader and is optionally a contactless card reader of the ATM.

5. The method of claim 1, further comprising:
    establishing the second communication link responsive to the mobile device being placed within a detection range of the electromagnetic signal reader of less than 10 cm and optionally less than 4 cm.

6. The method of claim 1, further comprising:
    responsive to the user placing the mobile device within the detection range of the electromagnetic signal reader, sending, by the mobile device, identification data associated with the mobile device to the ATM.

7. The method of claim 1, further comprising:
    responsive to the user placing the mobile device within the detection range of the electromagnetic signal reader, sending, by the ATM, identification data associated with the ATM to the mobile device.

8. The method of claim 1, further comprising:
    responsive to detecting the input event, executing, by the ATM, a terminal application that is configured to communicate with the computing device.

9. The method of claim 1, further comprising:
    responsive to detecting the input event, sending a notification to at least one computing device of the selected remote bank teller indicating that the user wants to communicate; and
    responsive to receiving, at the computing device, the notification, executing, by the computing device, a teller application that is configured to communicate with the ATM.

10. The method of claim 1, further comprising:
    detecting the input event as a request by the user for a communication session with a bank teller.

11. The method of claim 1, further comprising:
    requesting the user to place the mobile device within the detection range of the electromagnetic signal reader of the ATM by requesting the user to tap the mobile device on the electromagnetic signal reader.

12. The method of claim 1, further comprising:
    capturing audio data via a microphone of the mobile device;
    via the point-to-point communication link, transmitting the audio data to the computing device; and
    outputting the audio data via a speaker of the computing device.

13. The method of claim 1, further comprising:
    capturing audio data via a microphone of the computing device;
    via the point-to-point communication link, transmitting the audio data to the mobile device; and
    outputting the audio data via a speaker of the mobile device.

14. The method of claim 1, further comprising:
    capturing video data via a camera of the ATM;
    via the first communication link, providing the video data from the ATM to the computing device; and
    displaying a video feed comprising the video data on a display of the computing device.

15. The method of claim 1, further comprising:
    capturing video data via a camera of the computing device;
    via the first communication link, providing the video data from the computing device to the ATM; and
    displaying a video feed comprising the video data on a display of the ATM.

16. A computer-implemented method for establishing a point-to-point communication link between a mobile device of a user of an ATM and a computing device of a selected remote bank teller, comprising:
    detecting, at an ATM, an input event indicating that a user of the ATM wants to communicate with a bank teller;
    capturing video data via a camera of the mobile device;
    via the point-to-point communication link, providing the video data from the mobile device to the computing device;
    responsive to detecting the input event, by the ATM, establishing a first communication link with a computing device of a selected remote bank teller and requesting the user to place a mobile device of the user within a detection range of an electromagnetic signal reader of the ATM;
    responsive to the user placing the mobile device within the detection range of the electromagnetic signal reader, establishing, by the ATM, a second communication link with the mobile device;
    thereby establishing a point-to-point communication link between the computing device and the mobile device; and displaying a video feed comprising the video data on a display of the computing device.

17. The method of claim 16, further comprising:
    capturing video data via a camera of the computing device;
    via the point-to-point communication link, providing the video data from the computing device to the mobile device; and
    displaying a video feed comprising the video data on a display of the mobile device.

18. The method of claim 1, further comprising:
    establishing the point-to-point communication link as a bi-directional audio only communication link.

19. A computing system, comprising:
    an ATM, a mobile device of a user of an ATM and a computing device of a selected remote bank teller, wherein the ATM is configured to:

detect an input event indicating that a user of the ATM wants to communicate with a bank teller;

establish a first communication link with a computing device of a selected remote bank teller and request the user to place the mobile device within a detection range of an electromagnetic signal reader of the ATM responsive to the input event being detected; and establish a second communication link with the mobile device responsive to the user placing the mobile device within the detection range of the electromagnetic signal reader;

thereby causing a point-to-point communication link to be established between the computing device and the mobile device.

20. The computing system of claim 19, wherein the computing device is a desktop computer or a laptop or a mobile device of the selected remote bank teller.

* * * * *